US009680842B2

(12) United States Patent
Thomas et al.

(10) Patent No.: US 9,680,842 B2
(45) Date of Patent: Jun. 13, 2017

(54) DETECTING CO-OCCURRENCE PATTERNS IN DNS

(71) Applicant: Verisign, Inc., Reston, VA (US)

(72) Inventors: Matthew Thomas, Atlanta, GA (US); Michael Noll, Vinelz (CH)

(73) Assignee: VERISIGN, INC., Reston, VA (US)

( * ) Notice: Subject to any disclaimer, the term of this patent is extended or adjusted under 35 U.S.C. 154(b) by 264 days.

(21) Appl. No.: 13/963,390

(22) Filed: Aug. 9, 2013

(65) Prior Publication Data

US 2015/0047033 A1 Feb. 12, 2015

(51) Int. Cl.
*G06F 21/56* (2013.01)
*H04L 29/06* (2006.01)
*H04L 29/12* (2006.01)

(52) U.S. Cl.
CPC ...... *H04L 63/1408* (2013.01); *H04L 61/1511* (2013.01)

(58) Field of Classification Search
CPC ........... G06F 17/30991; H04L 63/1416; H04L 63/1425; H04L 63/1458; H04L 63/1466; H04L 63/1441
See application file for complete search history.

(56) References Cited

U.S. PATENT DOCUMENTS

| | | |
|---|---|---|
| 7,165,116 B2 | 1/2007 | Grove et al. |
| 7,590,707 B2 | 9/2009 | McCloy et al. |
| 8,015,551 B2 * | 9/2011 | Kinno et al. ................ 717/127 |
| 8,024,428 B2 * | 9/2011 | Adelman et al. ............. 709/219 |
| 8,040,798 B2 | 10/2011 | Chandra et al. |
| 8,069,182 B2 | 11/2011 | Pieper |
| 8,347,394 B1 | 1/2013 | Lee |
| 2003/0004688 A1 | 1/2003 | Gupta et al. |
| 2005/0132296 A1 | 6/2005 | Milic-Frayling et al. |
| 2005/0289241 A1 | 12/2005 | Ruiz |
| 2008/0168049 A1 | 7/2008 | Gao et al. |
| 2009/0204696 A1 | 8/2009 | Zhang et al. |
| 2009/0282038 A1 | 11/2009 | Subotin et al. |
| 2010/0179955 A1 * | 7/2010 | Wu et al. ...................... 707/748 |
| 2010/0325250 A1 | 12/2010 | Colosi |
| 2011/0178831 A1 | 7/2011 | Ravichandran |

(Continued)

FOREIGN PATENT DOCUMENTS

| | | |
|---|---|---|
| CN | 102685145 A | 9/2012 |
| EP | 1655919 B1 | 5/2006 |
| WO | 2012134562 A1 | 10/2012 |

OTHER PUBLICATIONS

Kazumichi Sato et al., "Extending Black Domain List by Using Co-Occurrence Relation between DNS Queries", IEICE Transactions on Communications, Communications Society, Tokyo, Japan, vol. E95B, No. 3, Mar. 2012, pp. 794-802.*

(Continued)

*Primary Examiner* — Eleni Shiferaw
*Assistant Examiner* — Paul Callahan
(74) *Attorney, Agent, or Firm* — MH2 TECHNOLOGY LAW GROUP, LLP (57) ABSTRACT

Techniques for inferring the existence of suspicious software by detecting multiple name server requests for the same sets of non-existent domains. Implementations can allow for detecting the existence of malware or other suspicious software without requiring reverse engineering of the malware's domain generation algorithm.

24 Claims, 5 Drawing Sheets

(56) References Cited

U.S. PATENT DOCUMENTS

2012/0001843 A1   1/2012  Gravino
2012/0254398 A1   10/2012 Thomas
2012/0296927 A1   11/2012 Velipasaoglu et al.
2013/0159507 A1* 6/2013  Mason et al. ................. 709/224

OTHER PUBLICATIONS

Nan Jiang et al., "Identifying Suspicious Activities Through DNS Failure Graph Analysis", 2010 18th IEEE International Conference on Network Protocols (ICNP), 2010, pp. 144-153.
Jun Wu et al., "DNS Usage Mining Based on Clustering Analysis of Co-occurance Patterns: Methods and Applications", Graduate School, Chinese Academy of Sciences, Beijing, China, obtained Apr. 5, 2013, pp. 1-8.
Manos Antonakakis et al., "Building a Dynamic Reputation System for DNS", Georgia Institute of College of Computing, obtained Nov. 13, 2013, pp. 1-17.
Extended European Search Report dated Mar. 9, 2015, European Application No. 14180373.4 filed Aug. 8, 2014, pp. 1-9.

* cited by examiner

DETECTING CO-OCCURRENCE PATTERNS IN DNS

TECHNICAL FIELD

The techniques provided herein relate to detecting suspicious software.

SUMMARY

According to some implementations, a method is provided. The method includes obtaining a plurality of name resolution requests received over a period of time from a plurality of name servers, generating, using a sliding time window with a fixed duration, sets of lists, one set of lists for each of the plurality of name servers, each list comprising one or more domains requested within the fixed duration, combining the sets of lists, whereby a global set of lists is generated, detecting a co-occurring list in the global set of lists, determining that a plurality of domains in the co-occurring list are non-existent, and indicating the domains in the co-occurring list.

Various optional features of the above method include the following. Each name resolution request can include an identification of a domain, a time, and a name server. Each name server can include a recursive name server. The method can include sorting the plurality of name resolution requests according to name server, such that the sets of lists, one for each of the plurality of name servers, are obtained. The method can include instituting remediation measures against malware associated with the co-occurring list. The detecting can include constructing a frequent pattern tree. The detecting can include performing a breadth-first search. The method can include determining that the plurality of domains in the co-occurring list that are non-existent comprises at least 1000 domains. The method can include determining that the co-occurring list includes at least 1000 domains. The indicating can include displaying. The method can include indicating that suspicious software might have requested the domains in the co-occurring list. The method can include indicating that malware might have requested the domains in the co-occurring list.

According to some implementations, a system is provided. The system includes at least one processor in communication with a plurality of name servers, the at least one processor configured to: obtain a plurality of name resolution requests received over a period of time from a plurality of name servers, generate, using a sliding time window with a fixed duration, sets of lists, one set of lists for each of the plurality of name servers, each list comprising one or more domains requested within the fixed duration, combine the sets of lists, such that a global set of lists is generated, detect a co-occurring list in the global set of lists, determine that a plurality of domains in the co-occurring list are non-existent, and indicate the domains in the co-occurring list.

Various optional features of the above system include the following. Each name resolution request can include an identification of a domain, a time, and a name server. Each name server can include a recursive name server. The at least one processor can be further configured to: sort the plurality of name resolution requests according to name server, such that the sets of lists, one for each of the plurality of name servers, are obtained. The system can include at least one processor configured to institute remediation measures against malware associated with the co-occurring list. The at least one processor can be further configured to construct a frequent pattern tree. The at least one processor can be further configured to perform a breadth-first search. The at least one processor can be further configured to determine that the plurality of domains in the co-occurring list that are non-existent includes at least 1000 domains. The at least one processor can be further configured to determine that the co-occurring list includes at least 1000 domains. The system can be operably coupled to a monitor, where the at least one processor can be further configured to indicate that malware requested domains in the co-occurring list by displaying an indication on the monitor. The at least one processor can be further configured to indicate that suspicious software might have requested the domains in the co-occurring list. The at least one processor can be further configured to indicate that malware might have requested the domains in the co-occurring list.

DESCRIPTION OF DRAWINGS

The accompanying drawings, which are incorporated in and constitute a part of this specification, illustrate implementations of the described technology. In the figures.

DETAILED DESCRIPTION

The growth of computer networking has brought with it domains used for unscrupulous activities. Such domains may be used for scams, phishing, spamming, botnet command-and-control activities, etc. The ability to perpetrate malicious activity depends on coordinating a large collection of computers infected with malware to perform a particular activity. These large-scale operations typically use the domain name system ("DNS") to help direct infected computers to the appropriate location on the network. (DNS maintains the mapping between domain names and the internet protocol ("IP") addresses of a web site.) In the case of attacks such as spam and phishing attacks, these domains may be used to direct victims to a web site (or through a proxy) that hosts malicious content. In the case of botnet command-and-control, infected computers may locate the controller machine according to its domain name. In particular, computers infected with the same malware typically contact the same set of domains. Many such domains are non-existent, i.e., are not registered. Accordingly, some implementations infer the existence malware by detecting multiple requests for the same sets of domains, some of which are non-existent. Advantageously, such implementations allow for detecting the existence of malware or other suspicious software without requiring reverse engineering of the malware's domain generation algorithm.

Reference will now be made in detail to example implementations, which are illustrated in the accompanying drawings. Where possible the same reference numbers will be used throughout the drawings to refer to the same or like parts.

Figure 1:
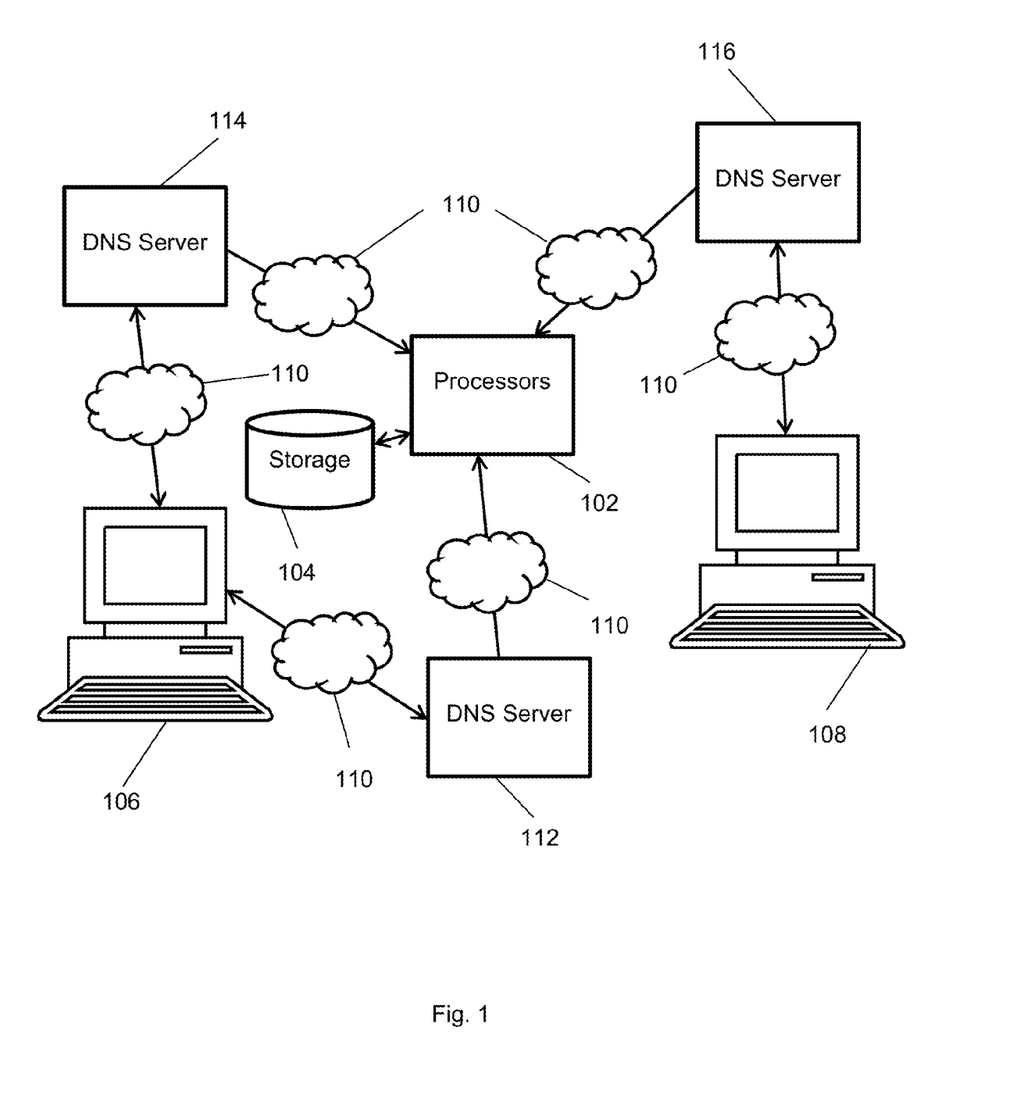
FIG. 1 is a schematic diagram of a system according to some embodiments of the present invention.

FIG. 1 is a schematic diagram of a system according to some embodiments of the present invention. The system includes processors 102 configured to carry out at least portions of the methods disclosed herein. Processors 102 can be implemented as part of a computer or computer system, e.g., a rack-mount server; for purposes of description herein, processors 102 can include such a computer or computer system. Processors 102 are communicatively coupled to persistent storage 104, such as a hard disk or disk array. Storage 104 can store instructions for execution by processors 102 to perform at least some portions of the methods disclosed herein.

Processors 102 are communicatively coupled, by way of network 110, to DNS servers 112, 114 and 116. Network 110 can be, for example, the internet. Processors 102 can receive data from DNS servers 112, 114 and 115 as disclosed herein. In particular, processors 102 can receive data reflecting name resolution requests received from each of DNS servers 112, 114 and 116.

DNS servers 112, 114 and 116 can be, for example, top-level domain servers and/or recursive name servers. In general, when a client device, e.g., computers 106 or 108, receives a uniform resource locator ("URL") from, e.g., a user or application, the client device sends a name resolution request through network 110 to a name server to obtain an IP address corresponding to the URL. If a recursive server receives a name resolution request and does not itself have information for that domain, it sends a request to a top-level domain server to obtain the associated IP address. In general, each recursive server represents a different geographical region. DNS servers 112, 114 and 116 convey to processors 102 information reflecting each name resolution request that they receive. In particular, DNS servers 112, 114 and 116 can convey data indicating, for each name resolution request received, a time that the request was received, an identification (e.g., IP address) of the name server that received the request, and a domain whose corresponding IP address was requested.

Computers 106 and 108 in FIG. 1 are infected with malware, such as a virus or Trojan horse. In particular, computers 106 and 108 can be so-called zombie computers. A malware operator can utilize such zombie computers 106 and 108 to perform malicious actions, such as sending email spam or performing a distributed denial of service attack. The malware thus causes computers 106 and 108 to seek instructions, such as what spam to send and to where, or what computer to bombard as part of a denial of service attack. (Embodiments are not limited to detecting denial-of-service malware.) Computers 106 and 108 typically obtain such instructions by contacting computers using a large number of URLs.

Typically, many URLs that zombie computers contact for instructions are non-existent. That is, many URLs that malware-infected computers contact are not registered with a register at the time of contact, and are therefore not associated with an IP address.

Figure 2:
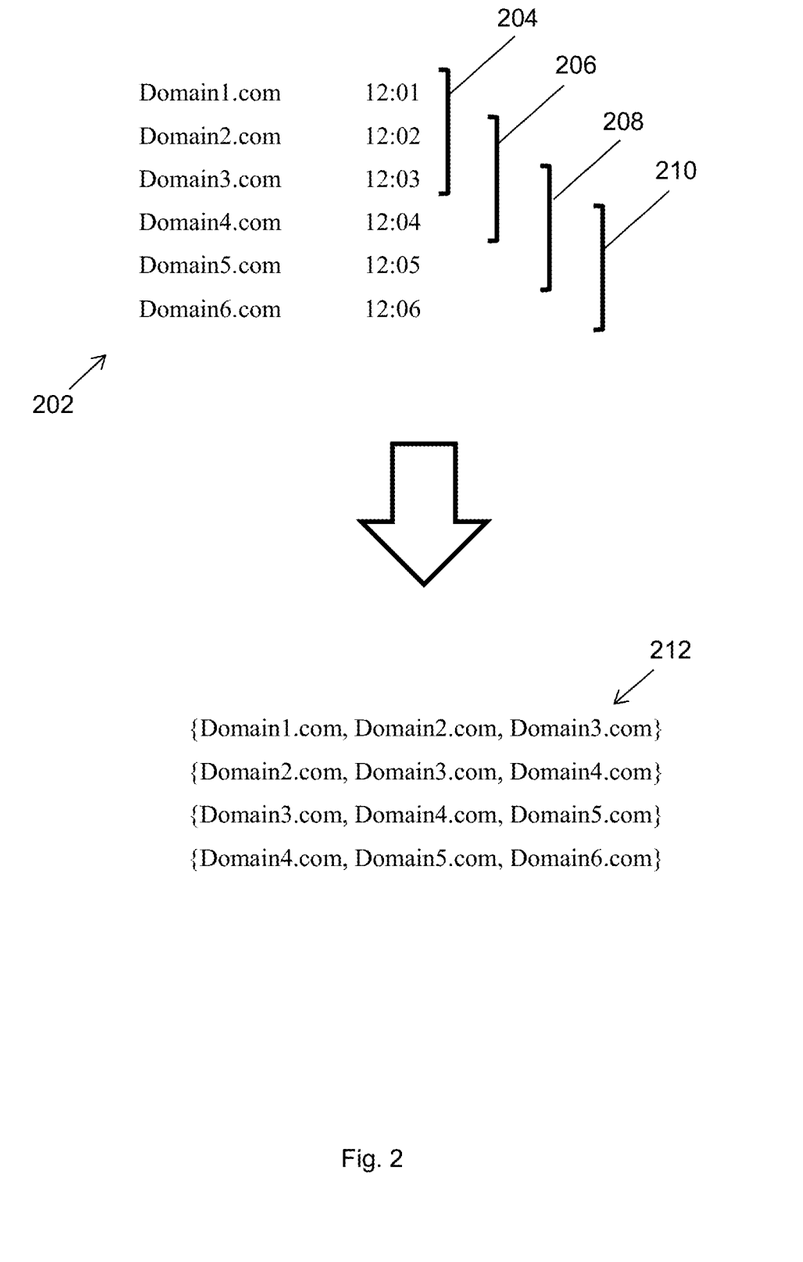
FIG. 2 is a schematic diagram of a method according to some embodiments of the present invention.

FIG. 2 is a schematic diagram of a portion of a method according to some embodiments of the present invention. The method aims to identify malware infections by detecting the co-occurrence of sets of multiple time-clustered name resolution requests from many different malware-infected computers. That is, the method can detect malware-infected computers by determining that one or more name servers receive, from a plurality of infected computers, requests for the same set of URLs clustered together in time. More generally, the method can detect the existence of suspicious software by detecting the co-occurrence of requests for non-existent domains.

The method can begin when an embodiment, such as that illustrated in FIG. 1 including processors 102 and storage 104, receives a stream of data reflecting name resolution requests received by one or more name servers. The stream of name resolution requests can reflect requests received over a period of time, e.g., an hour, a day, a week, etc. In general, the period of time can be any interval from one minute to several weeks. The stream of data can include data reflecting discreet name resolution requests. For example, the data for each request can include a time of day (e.g., internet time), a requested domain (e.g., a character string), and an identification of the name server that received the request (e.g., an IP address).

Once the embodiment receives a sufficient amount of data reflecting name resolution requests, it can group the data according to name servers that received the request. The embodiment can then arrange the data by time within each group. One such arrangement 202 is illustrated in FIG. 2. That is, arrangement 202 represents requested domains received by a single name server, where the requested domains are arranged by time that the request was received by the name server. Note that some embodiments receive data from multiple name servers; thus, such embodiments arrange the type of data illustrated by arrangement 202 multiple times.

Next, the embodiment uses sliding time window 204, 206, 208 and 210 to obtain lists of domains for which a name server received requests clustered together in time. By way of example, sliding time window 204, 206, 208 and 210 can be of duration, e.g., any number of seconds between 0.1 second and 10 seconds. Thus, FIG. 2 schematically illustrates sliding time window 204, 206, 208 and 210 applied to arrangement 202.

The embodiment thus obtains a set of lists 212 of domains that were requested from a name server in temporal proximity to one-another. In the example illustrated in FIG. 2, each list 212 includes three domains. However, each list can include any number of domains.

Once the embodiment obtains one or more sets of lists of temporally-clustered domains, it combines the sets of lists to produce a global set of lists of temporally-clustered requested domains. The embodiment then detects co-occurrence of such lists from among the global set of lists. This process is discussed in detail in reference to FIG. 3.

Figure 3:
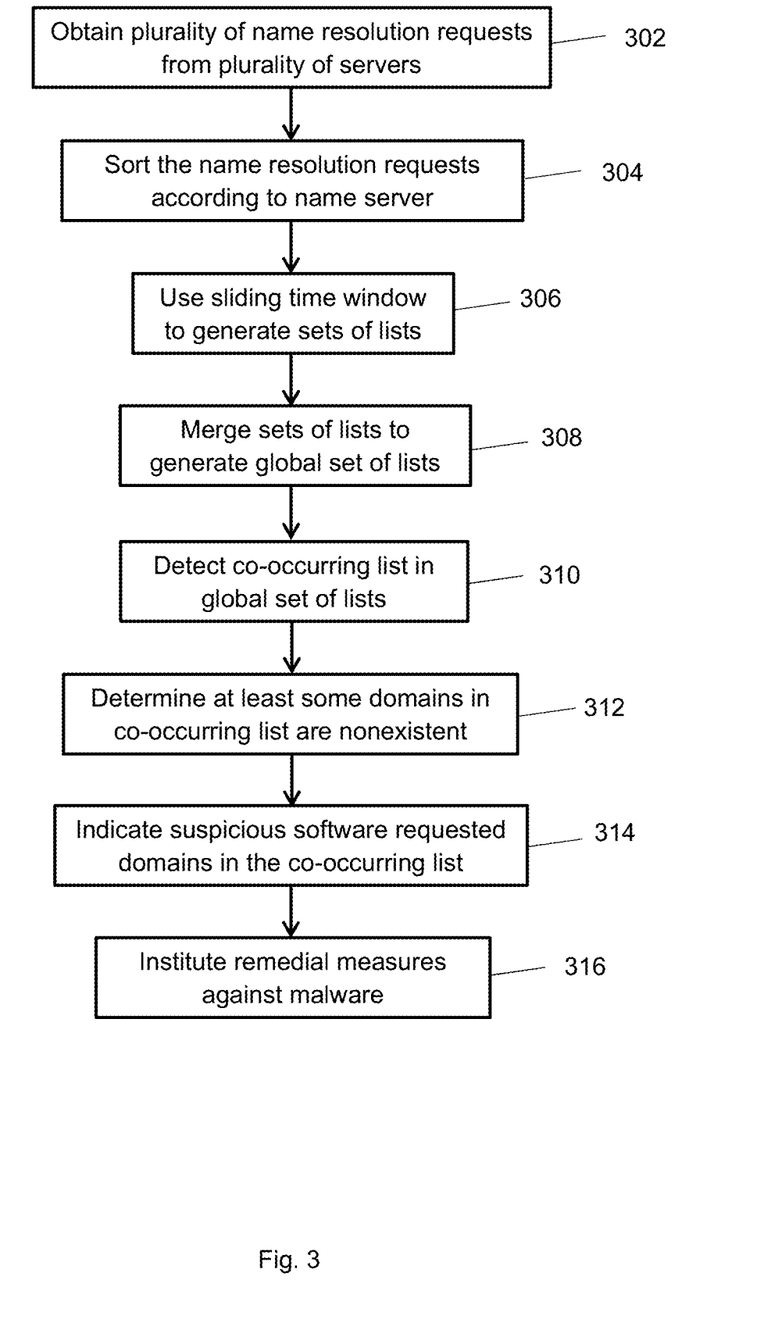
FIG. 3 is a flowchart of a method according to some embodiments of the present invention.

FIG. 3 is a flowchart of a method according to some embodiments of the present invention. The method of FIG. 3 can include the method portion depicted according to FIG. 2. Further, the method of FIG. 3 can be implemented using an embodiment illustrated in FIG. 1, including processors 102 and storage 104.

At block 302, the method obtains a plurality, e.g., as stream, of name resolution requests. The method can obtain such requests, e.g., from DNS servers 112, 114 and 116. The DNS servers can be programmed to provide the name resolution requests, e.g., to processors 102 via the internet.

At block 304, the method sorts the name resolution requests it received at block 302 according to receiving name server. For example, if processors 102 receive name resolution requests from seven different name servers, then the results of block 304 will be seven sets of name resolutions requests.

At block 306, the method uses a sliding time window to generate sets of lists. The technique of block 306 is performed for each set of name resolution requests produced at block 304. More particularly, the technique of block 306 is performed for each set of name resolution requests received from a single name server. Thus, block 306 generates one set of lists for each name server. Additional details of the technique of block 306 are discussed above in reference to FIG. 2.

At block 308, the method combines the sets of lists generated at block 306 to generate a global set of lists. The combination can be an ordinary merge for example, that is, a set-theoretic union, with duplicates permitted. For example, merging the set of lists [{Domain1.com, Domain2.com}, {Domain2.com, Domain3.com}] with the set of lists [{Domain1.com, Domain2.com}, {Domain3.com, Domain4.com}] yields the global set of lists [{Domain1.com, Domain2.com}, {Domain1.com, Domain2.com}, {Domain2.com, Domain3.com}, {Domain3.com, Domain4.com}].

At block 310, the method detects at least one co-occurring list in the global set of lists. A co-occurring list here means a list that appears at least twice. Thus, block 310 detects one or more lists that appear more than once in the global set of lists. Many existing techniques can be used to detect a co-occurring list. For example, techniques that construct a frequent pattern tree can be used, such as that described in J. Han, H. Pei, and Y. Yin, *Mining Frequent Patterns without Candidate Generation*, Proc. Conf. on the Management of Data (SIGMOD'00, Dallas, Tex.) ACM Press, New York, N.Y., USA 2000. As another example, techniques that utilize a breadth-first search can be used, such as "apriori", e.g., as disclosed in Rakesh Agrawal and Ramakrishnan Srikant, *Fast Algorithms For Mining Association Rules In Large Databases*, Proc. 20th Intl Conf. on Very Large Data Bases, VLDB, pp. 487-499, Santiago, Chile, September 1994. An yet additional examples, variations of the above algorithms, or different algorithms for detecting co-occurrence can be used. The output of the algorithms, and that of block 310, is an identification of at least one list that appears at least twice in the global set of lists. In some embodiments, the output of block 310 includes a count, for each co-occurring list, of the number of occurrences of the co-occurring list in the global set of lists.

At block 312, the method determines that at least some domains in the (one or more) co-occurring lists are non-existent. That is, the method determines that at least some domains in the co-occurring list(s) are not registered. This can be accomplished by, for example, processors 102 communicating with a name server to determine whether the domains in question are currently registered.

At block 314, the technique indicates that suspicious software or malware likely requested domains in the co-occurring list. This conclusion can result from the method determining co-occurring lists of domains that include a plurality of non-existent domains. The indication can be in any of several forms. In some embodiments, the indication includes displaying the domains on a computer monitor a notice. The notice can include or link to a list of the domains in the co-occurring list(s) and/or a list of the non-existent domains in the co-occurring list(s). Alternately, the technique can indicate (e.g., display) the domains in the co-occurring list without indicating that the domains might be associated with suspicious software or malware.

In some embodiments, the number of domains or non-existent domains in a co-occurring list must exceed a threshold before triggering block 314. In such embodiments, the threshold can be, for example, 100, 500, 750, 1000, 1500, 2000, etc. In general, the threshold can be any number between 100 and 10,000. In general, the threshold can be determined by taking into account where in the recursive DNS hierarchy this system is implemented, the type of top-level domains it might be serving, and/or the number of users behind the name servers.

At block 316, the method institutes remedial measures against the suspected malware. The remedial measures can include, for example, communicating with one or more name servers to provide an indication that malware likely requested the domains or the non-existent domains appearing in the co-occurring list(s). The remedial measures can include, for example, blocking, or requesting blocking, of name server requests for registered domains that are included in the co-occurring list(s). Other remedial measures are also contemplated.

Figure 4:
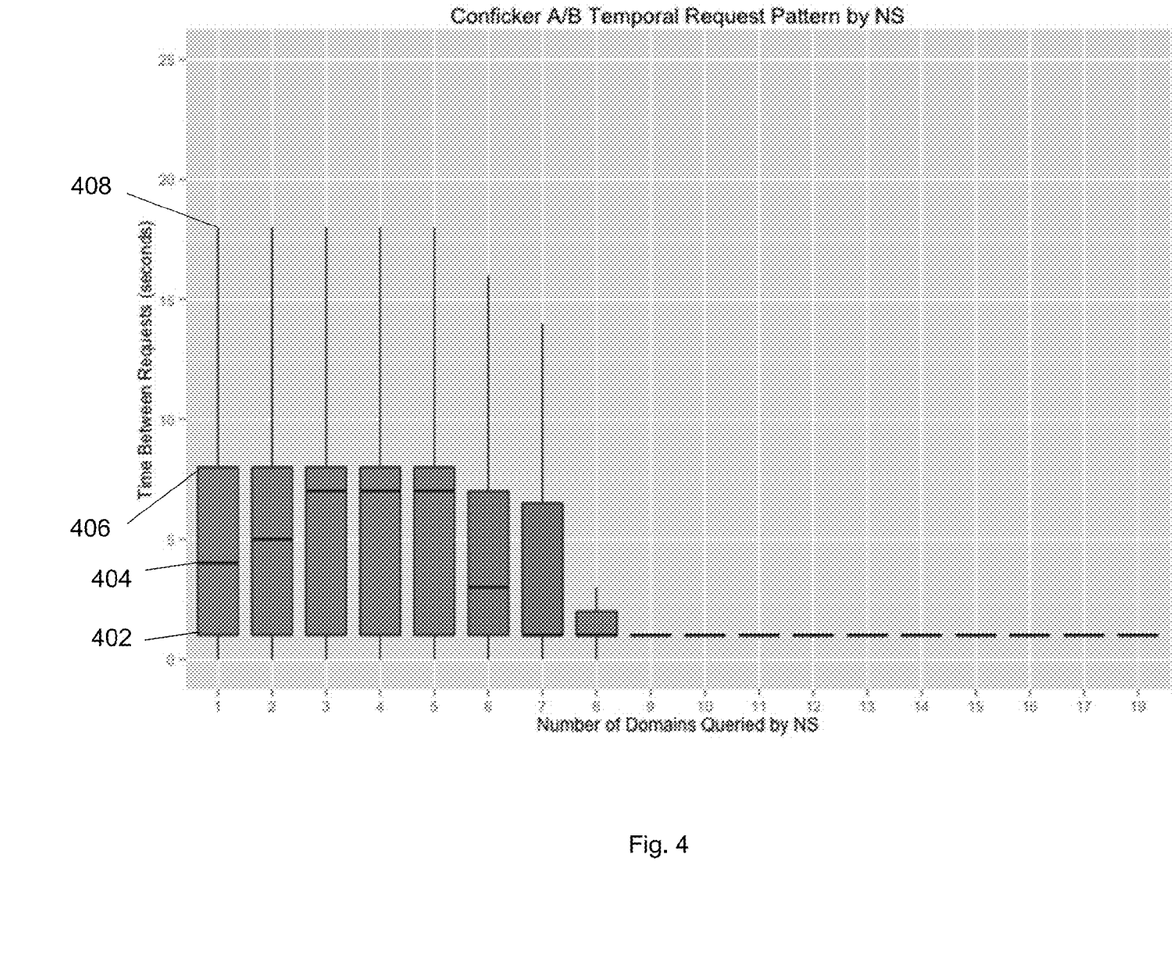
FIG. 4 is a chart of name server queries according to some embodiments of the present invention.

FIG. 4 is a chart of name server queries according to some embodiments of the present invention. In particular, FIG. 4 is a chart illustrating time between domain name requests as a function of number of requests for domains by computers infected with versions of the Conficker NB malware. The chart illustrates, in particular for each number of requested domains, first quartile 402, median 404, third quartile 406, and standard deviation 408. The chart of FIG. 4, and analogous charts for new malware, can be used to fine-tune implementations of the technique by providing, e.g., threshold information as discussed above in reference to block 314.

Figure 5:
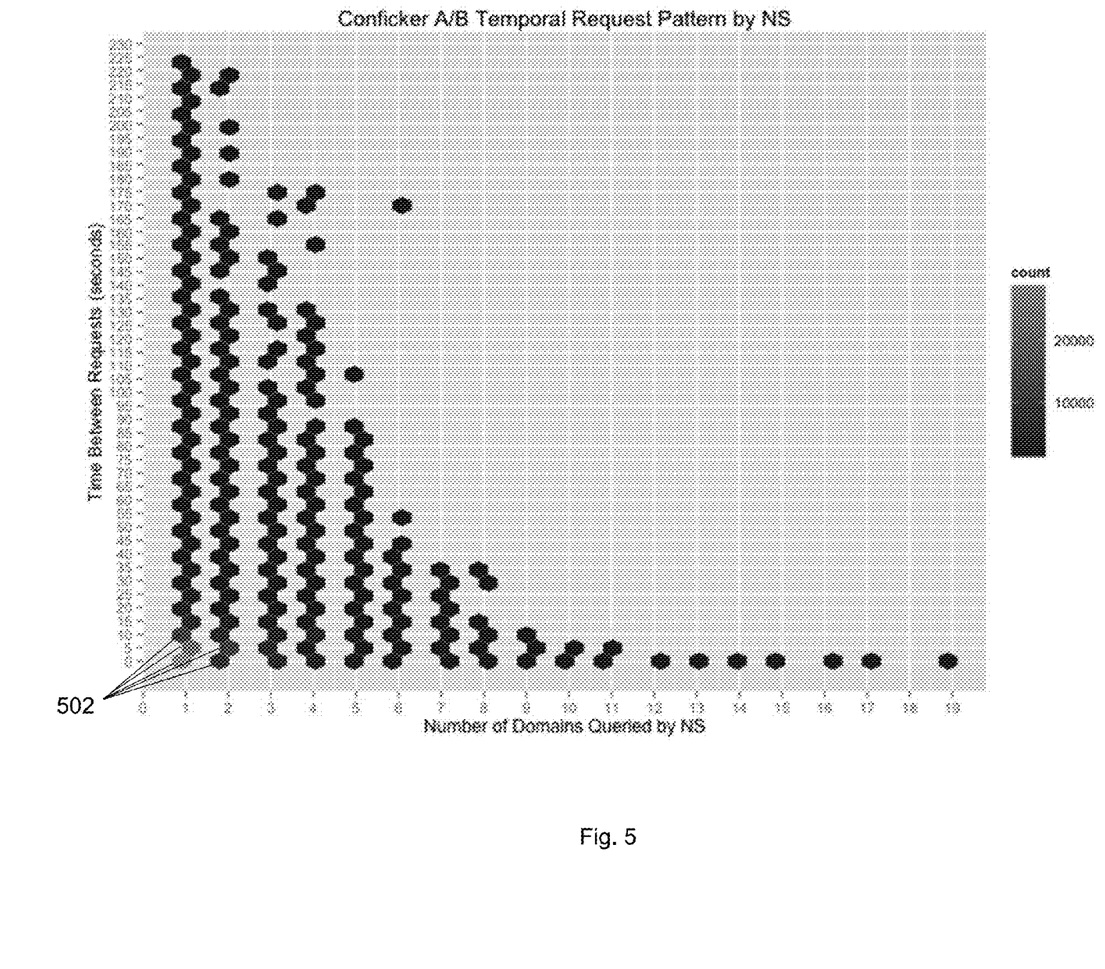
FIG. 5 is a chart of name server queries according to some embodiments of the present invention.

FIG. 5 is a chart of name server queries according to some embodiments of the present invention. In particular, the chart of FIG. 5 is an x/y scatterplot of domain name requests by computers infected with versions of the Conficker NB malware, where the x-axis represents number of domains requested, and the y-axis represents time between requests in seconds. Note that the most frequent case 502 shows one or two requests within a five-to-ten-second period. The chart of FIG. 5, and analogous charts for new malware, can be used to fine-tune implementations of the technique by providing, e.g., threshold information as discussed above in reference to block 314.

Some implementations detect multiple co-occurring domain requests and utilize this information for cache optimization. For example, such implementations can detect that requests for a particular first domain are frequently followed for requests for a second domain. In such instances, such implementations can be used to enhance prefetching and cache techniques in web browsers and name servers.

Some implementations detect multiple co-occurring domain requests and utilize this information to determine associations or affiliations between domains. This information can be used by advertisers, for example, so that they can place advertisements in multiple places and increase the chance of reaching a target audience.

Implementations can be used to detect co-occurrence patterns for many types of requests, not limited to DNS requests. For example, some implementations can be used to detect co-occurrence patterns in web page requests. Such implementations can be utilized in a content-delivery environment, where an entity hosts many (e.g., hundreds) of web pages. Such an entity can apply the techniques disclosed herein to detect patterns of requests for unavailable web pages, e.g., requests that yield HTTP 404 Not Found errors.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. Further, each hardware component can include persistent storage, such as a hard drive or drive array, which can store program instructions to perform the techniques presented herein. That is, such program instructions can serve to perform the disclosed methods. Other configurations of the first and second devices as discussed herein, and other hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A computer-implemented method for detecting aberrant domain name system (DNS) resolution requests, the method comprising:
   obtaining over a computer network a plurality of DNS name resolution requests received over a period of time by a plurality of DNS name servers;
   generating, using a sliding time window with a fixed duration, electronically represented sets of lists, one set of lists for each of the plurality of DNS name servers, each list comprising a plurality of domains requested within the fixed duration;
   combining the sets of lists, by at least one electronic processor, whereby a global set of lists is generated;
   identifying, by at least one electronic processor, a co-occurring list that appears at least twice in the global set of lists, wherein the co-occurring list that appears at least twice in the global set of lists comprises a particular plurality of DNS name resolution requests that have been received by the plurality of DNS name servers at least twice;
   determining, by at least one electronic processor, that a plurality of domains in the co-occurring list are non-existent; and
   indicating, by at least one electronic processor, the plurality of domains in the co-occurring list that are non-existent.

2. The method of claim 1, wherein each DNS name resolution request comprises an identification of a domain, a time, and a name server.

3. The method of claim 1, wherein each DNS name server comprises a DNS recursive name server.

4. The method of claim 1, further comprising:
   sorting the plurality of DNS name resolution requests according to DNS name server, whereby the sets of lists, one for each of the plurality of DNS name servers, are obtained.

5. The method of claim 1, further comprising instituting remediation measures against malware associated with the co-occurring list.

6. The method of claim 1, wherein the identifying comprises constructing a frequent pattern tree.

7. The method of claim 1, wherein the identifying comprises performing a breadth-first search.

8. The method of claim 1, further comprising determining that the plurality of domains in the co-occurring list that are non-existent comprises at least 1000 domains.

9. The method of claim 1, further comprising determining that the co-occurring list comprises at least 1000 domains.

10. The method of claim 1, wherein the indicating comprises displaying.

11. The method of claim 1, further comprising indicating that suspicious software might have requested the domains in the co-occurring list.

12. The method of claim 1, further comprising indicating that malware might have requested the domains in the co-occurring list.

13. A system for detecting aberrant domain name system (DNS) resolution requests, the system comprising:
    at least one electronic hardware processor in communication with a plurality of DNS name servers, the at least one electronic hardware processor configured to:
       obtain a plurality of DNS name resolution requests received over a period of time by a plurality of DNS name servers;
       generate, using a sliding time window with a fixed duration, sets of lists, one set of lists for each of the plurality of name servers, each list comprising a plurality of domains requested within the fixed duration;
       combine the sets of lists, whereby a global set of lists is generated;
       identify a co-occurring list that appears at least twice in the global set of lists, wherein the co-occurring list that appears at least twice in the global set of lists comprises a particular plurality of DNS name resolution requests that have been received by the plurality of DNS name servers at least twice;
       determine that a plurality of domains in the co-occurring list are non-existent; and
       indicate that malware requested domains in the co-occurring list.

14. The system of claim 13, wherein each DNS name resolution request comprises an identification of a domain, a time, and a name server.

15. The system of claim 13, wherein each DNS name server comprises a DNS recursive name server.

16. The system of claim 13, wherein the at least one processor is further configured to: sort the plurality of DNS name resolution requests according to DNS name server, whereby the sets of lists, one for each of the plurality of DNS name servers, are obtained.

17. The system of claim 13, further comprising at least one processor configured to institute remediation measures against malware associated with the co-occurring list.

18. The system of claim 13, wherein the at least one processor is further configured to construct a frequent pattern tree to identify the co-occurring list.

19. The system of claim 13, wherein the at least one processor is further configured to perform a breadth-first search to identify the co-occurring list.

20. The system of claim 13, wherein the at least one processor is further configured to determine that the plurality of domains in the co-occurring list that are non-existent comprises at least 1000 domains.

21. The system of claim 13, wherein the at least one processor is further configured to determine that the co-occurring list comprises at least 1000 domains.

22. The system of claim 13 operably coupled to a monitor, wherein the at least one processor is further configured to indicate that malware requested domains in the co-occurring list by displaying an indication on the monitor.

23. The system of claim 13, wherein the at least one processor is further configured to indicate that suspicious software might have requested the domains in the co-occurring list.

24. The system of claim 13, wherein the at least one processor is further configured to indicate that malware might have requested the domains in the co-occurring list.

* * * * *